United States Patent [19]

Brown

[11] Patent Number: 4,995,701

[45] Date of Patent: Feb. 26, 1991

[54] ANTI-GLARE FILTER WITH IMPROVED VIEWING AREA

[75] Inventor: John W. Brown, Sea Girt, N.J.

[73] Assignee: Qantix Corporation, Flemington, N.J.

[21] Appl. No.: 319,525

[22] Filed: Mar. 6, 1989

[51] Int. Cl.⁵ ............................................ G02B 27/00
[52] U.S. Cl. .............................. 350/276 R; 350/339 F
[58] Field of Search ...................... 350/276 R, 339 F

[56] References Cited

U.S. PATENT DOCUMENTS 4,165,920 8/1979 Brown .
4,473,277 9/1984 Brown .
4,697,881 10/1987 Brown .
4,756,603 7/1988 Ohtani ............................ 350/276 R Primary Examiner—Bruce Y. Arnold
Assistant Examiner—Rebecca D. Gass
Attorney, Agent, or Firm—Lerner, David, Littenberg, Krumholz & Mentlik

[57] ABSTRACT

A filter for reducing the glare of a viewing screen caused by ambient light and increasing the viewing area constructed of a substantially transparent sheet of material having first and second faces. The first face is substantially planar while the second face has a plurality of V-shaped grooves, each groove being formed by two walls. The geometry of the V-shaped grooves is such that ambient light enters the filter and becomes trapped therein due to internal reflection.

15 Claims, 2 Drawing Sheets

ANTI-GLARE FILTER WITH IMPROVED VIEWING AREA

BACKGROUND OF THE INVENTION

The present invention is directed generally to anti-glare devices, and more particularly, to a filter for transmission screens or liquid crystal displays (LCD) for eliminating glare caused by ambient light, including horizontal light rays from behind the operator, while at the same time increasing the vertical viewing area.

It has long been recognized that the front face of a transmission screen such as the cathode ray tube (CRT) of an ordinary television screen or the CRT of a computer terminal produces glare caused by reflected ambient light. As a result of this phenomena, a substantial amount of glare is encountered when viewing, for example, a CRT in a brightly lit room. The glare problem can be reduced by increasing the intensity of the radiation from the CRT. However, manufacturing CRT's capable of producing the intensity necessary to overcome glare encountered in a brightly lit room greatly increases the cost of the CRT. It is therefore desirable to produce a filter or overlay which will reduce the glare produced by ambient light.

U.S. Pat. Application Ser. No. 716,237, filed Aug. 20, 1976, now abandoned, was directed to an overlay or filter for the viewing surface of a television screen to reduce front face glare. The overlay is constructed of a sheet of transparent material having a planar back face and a front face having a plurality of V-shaped grooves therein such that the overlay, when viewed from the side, has a saw-toothed profile. The overlay is flexible such that a film of oil can be applied to the back surface of the overlay and, by pressing the overlay against the viewing surface of the television screen, the overlay adheres thereto. The adherence of the overlay to the television screen together with the film of oil therebetween minimizes the optical interference between the overlay and the television screen. Unfortunately, this overlay did not produce satisfactory results. The overlay produced images, known as echo images, which interfered with the intelligence displayed on the television screen.

In U.S. Pat. No. 4,165,920, a front face glare reduction overlay including an echo reduction improvement is disclosed. The improvement involves applying a coating of opaque material to the peaks of the saw tooth forming the front surface of the overlay. It is also disclosed in the U.S. Pat. No. 4,165,920 that the horizontal portion of the saw tooth should be inclined approximately six degrees from the horizontal and the vertical portion of the saw tooth should be inclined approximately thirty degrees from the vertical. Using these angles in conjunction with the opaque material provides a front face glare reduction overlay which produces satisfactory results. However, despite the satisfactory results, it proved difficult to manufacture the peaks of the saw tooth with a sharp point. Because the peaks tended to have a round or lenticular shape, they were difficult to coat with the opaque material. Light from the transmission screen was refracted by the uncoated or partially coated peaks in a number of different vertical directions, thereby creating a further problem with echo images.

In an effort to provide an overlay or filter for the viewing surface of a transmission screen to reduce front face glare which is both inexpensive and easy to manufacture, the present inventor developed an anti-glare device which is described and illustrated in U.S. Pat. No. 4,473,277. The anti-glare device of this patent need not be applied directly to the surface of the CRT but can, in fact, be positioned a discrete distance therefrom. With the back surface free of the requirement of being tightly fitted to the transmission screen, it was discovered that the opaque material applied to the peaks of the saw tooth could be eliminated if a circular polarizer or some similar filter means was mounted to the back surface of the anti-glare device. The anti-glare device disclosed in the aforementioned patent proved to be easy to manufacture and free of echo image problems. However, the cost of the circular polarizer together with the time and expense required by the bonding step which bonded the circular polarizer to the anti-glare device increased the cost of the device.

In U.S. Pat. No. 4,697,881, the present inventor disclosed an anti-glare filter for reducing the glare of a viewing screen caused by ambient light coming from the ceiling area where most of the distorting light originates. The anti-glare filter was constructed of a substantially transparent sheet of material having first and second faces. The first face was substantially planar and the second face had a plurality of V-shaped grooves, each groove being formed by two walls. A first wall of the V-shaped groove was inclined at an angle of at least the critical angle for the material with respect to the first face, whereby ambient light entering the second face and reflecting off the first face was internally reflected.

However, an anti-glare filter constructed in accordance with the teachings of U.S. Pat. No. 4,697,881 having an angle less than 45° and an index of refraction of the filter material of 1.41 or lower, will allow ambient light from behind the CRT operator to be reflected by the front face of the filter into the eyes of the operator. Thus, a reflection of the keyboard and the operator's moving hands may seriously interfere with the desired picture and be most disconcerting to the operator. Another problem encountered with filter material having a low index of refraction, for example 1.35, and a critical angle of 47.8° ($\theta$), limits the viewing area above the horizontal to 42.2° (90°−$\theta$), since the upper limit of the viewing area is determined by the extension of the sloping side of the groove.

SUMMARY OF THE PRESENT INVENTION

The shortcomings of the known anti-glare filters discussed above are overcome by the present invention wherein, according to one embodiment of the present invention, an anti-glare filter for reducing the glare of a viewing screen caused by ambient light, e.g., horizontal light rays from behind the operator, and simultaneously increasing the vertical viewing area is constructed of a substantially transparent sheet of material having first and second faces. The first face is substantially planar and the second face is constructed of a plurality of V-shaped grooves, each groove being formed by two walls. A first wall of the V-shaped groove is inclined at an angle with respect to the first face at least equal to or greater than a computed angle $\theta$ determined by the equation:

$$\sin(\text{angle } \theta) = \text{I.R.} \times \sin(2 \text{ angle } \theta - \text{C.A.}), \tag{1}$$

where I.R. equals the Index of Refraction of the filter material, and where C.A. equals the Critical Angle of the filter material determined from the equation:

$$\sin(\text{critical angle}) = 1/\text{I.R.}, \quad (2)$$

whereby ambient light entering the second face and reflecting off the first face is internally reflected.

According to another aspect of the present invention, the first wall is inclined at an angle of at least the computed angle $\theta$ with respect to the first face whereby ambient light entering the second face, passing through the first face and reflecting off the viewing screen, and then passing back through the first face is internally reflected.

According to another aspect of the present invention, when the anti-glare filter is used in conjunction with a transmission screen, the anti-glare filter may be curved to follow the contours of the transmission screen.

According to another aspect of the present invention, the second wall of the V-shaped groove is inclined at an angle of between plus or minus 10° with respect to a plane perpendicular to the first face. The second wall may be coated with an opaque material or may have a roughened surface to further improve the optical qualities of the anti-glare filter.

According to another aspect of the present invention, when the anti-glare filter is used in conjunction with a liquid crystal display, a portion of the first wall is covered with an opaque material. That portion of the wall covered with the opaque material includes that portion of the wall which is furthest from the first face.

The present invention, by relying on its unique geometry, provides an anti-glare filter which is both easy and inexpensive to manufacture. These and other advantages and benefits of the present invention will become apparent from the description of a preferred embodiment described hereinbelow.

BRIEF DESCRIPTION OF THE DRAWINGS

For a more complete understanding of the present invention, reference may be had to the following description of an exemplary embodiment considered in conjunction with the accompanying drawings, in which.

DESCRIPTION OF A PREFERRED EMBODIMENT

In U.S. Pat. No. 4,697,881, it is disclosed that the angle of the sloped side of the grooves should be at least equal to the critical angle of the material of the filter in order to eliminate all reflective glare from the CRT and the back surface of the filter. Although, in a practical application, such an arrangement does achieve its purpose of eliminating all glare from the CRT and the back face of the filter, it leads to another problem. If the filter is made of a material having an index of refraction of 1.35, the critical angle then equals 47.8° as calculated from equation (2). Since the upper limit of the viewing area is determined by the extension of the sloping sides of the grooves, the viewing area becomes uncomfortably limited.

The viewing area can be increased by increasing the viewing angle and decreasing the critical angle. However, in doing this the overall efficiency of the filter is decreased in such a way that glare from overhead illumination may encroach upon the upper portions of the viewing area. However, the glare that is most disruptive is that glare resulting from behind the operator such as a window. Therefore, I found that one could decrease the critical angle enough to appreciably increase the viewing angle or area, but not so much as to allow light from behind the operator to create glare. Hence, the angle of inclination $\theta$ is the minimum angle that will cancel all glare resulting from light originating behind the operator (generally horizontal) in order to ensure a maximum viewing area with minimum glare from overhead illumination.

Figure 1:
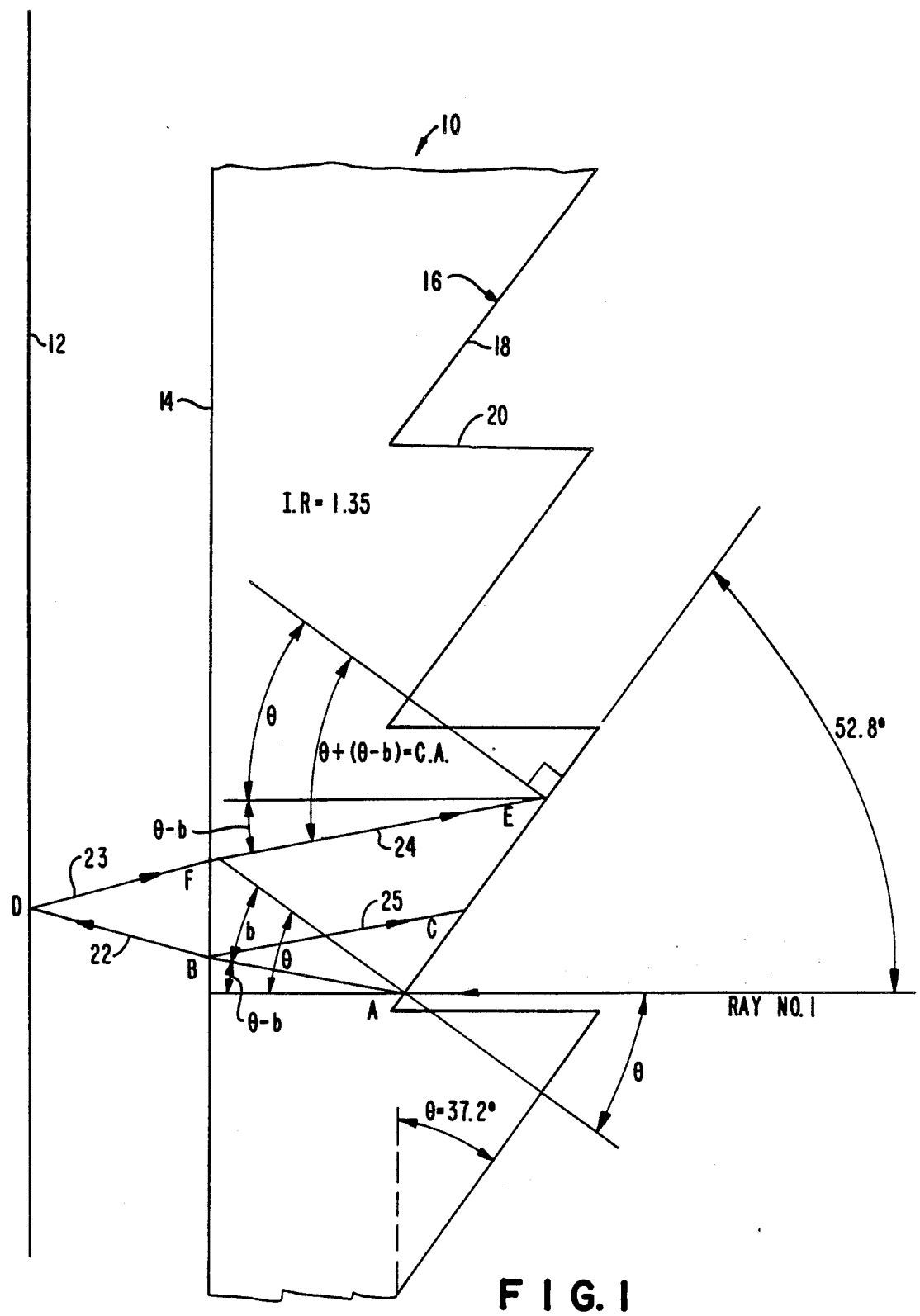
FIG. 1 is a side view of a portion of an anti-glare filter constructed according to the teachings of the present invention and a portion of a transmission screen, together with illustrative light rays demonstrating the operation of the present invention.

The minimum angle that may be used to eliminate the most objectionable reflection or glare resulting from generally horizontal light from behind the operator or a lamp situated on his/her desk is determined as illustrated in FIG. 1. Referring to FIG. 1, there is illustrated the anti-glare filter's profile wherein the sloping sides of the grooves intersect the filter's vertical plane at some unknown angle of inclination $\theta$. Also illustrated is a ray of horizontal light striking the filter at point A at an angle to the facet of $\theta$. The light proceeds to points B and D, and is then reflected to points C and E, respectively. Since BC is parallel to FE, the angle at C is equal to the angle at E.

It is necessary to find the angle of inclination $\theta$ such that the light ray at E strikes the surface at the critical angle and, therefore, will not pass through. Since the filter material selected, in accordance with one embodiment, has an index of refraction of 1.35, the critical angle is computed as above to be 47.8°.

Referring to FIG. 1, angle $\theta$+angle ($\theta$−b) should equal the critical angle or 47.8°. This can be represented by the equation:

$$2 \text{ angle } \theta - \text{angle } b = 47.8° \text{ (critical angle)}. \quad (3)$$

From the law of refraction:

$$\sin(\text{angle } b) = (\sin(\text{angle } \theta))/\text{I.R.}, \text{ where I.R. equal } 1.35. \quad (4)$$

Substituting into the above equation:

$$\sin(\text{angle } \theta) = \text{I.R.} \times \sin(2 \text{ angle } \theta - 47.8°). \quad (5)$$

Solving for angle $\theta$ by trial and error, angle $\theta = 37.2°$.

Figure 2:
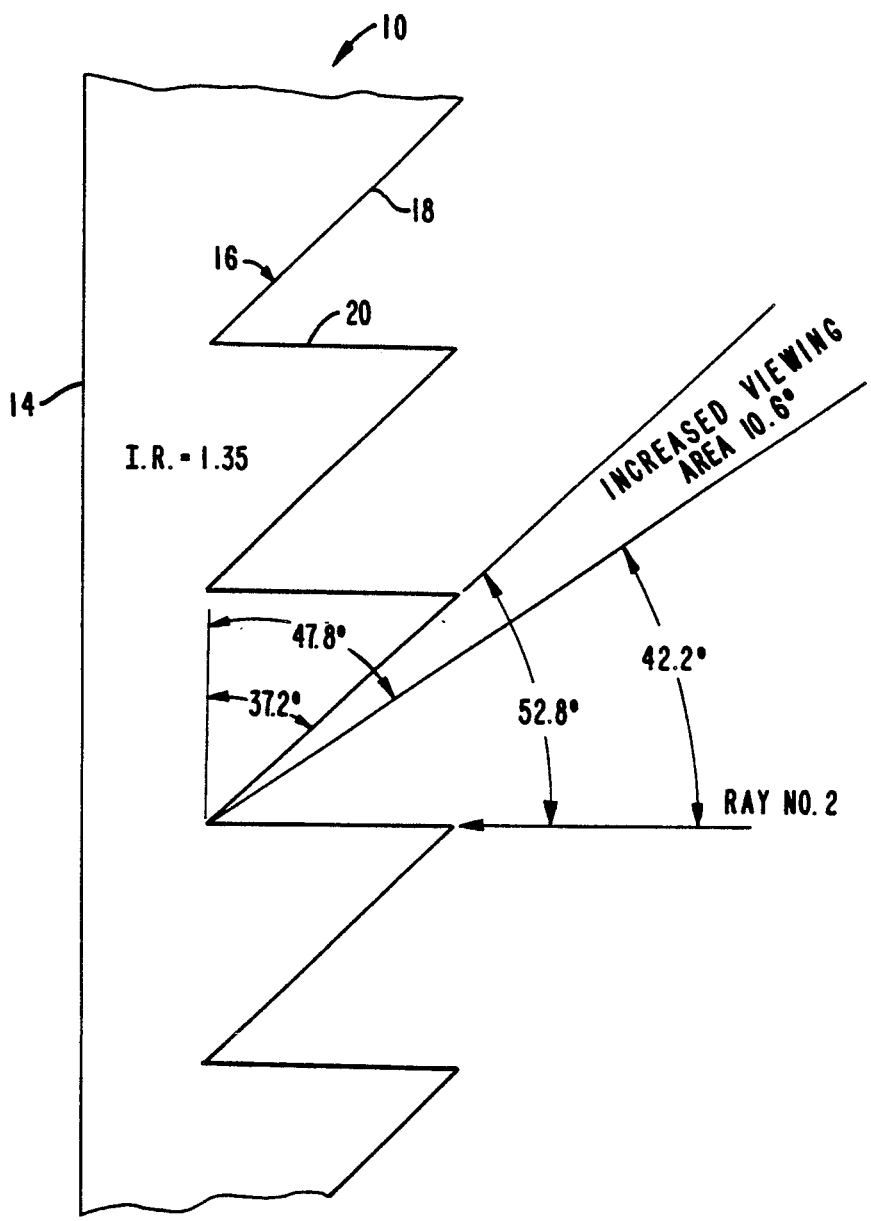
FIG. 2 is side view of a portion of an anti-glare filter illustrating the viewing area dependent on the angle of the sloped side of the grooves.

Therefore, if the filter is formed with an Angle $\theta$ of inclination of 37.2°, the filter will eliminate glare from a window and have a filter with a much wider viewing area vertically above the horizontal (52.8° as compared to 42.2°) as shown in FIG. 2. In order to widen the vertical viewing area and eliminate the most annoying ambient light glare, the critical angle of inclination should be at least the angle $\theta$ determined by equation (1):

The present invention is directed to an anti-glare filter constructed in accordance with the aforementioned teachings, a portion of which is shown in profile in FIG. 1. When the anti-glare filter 10 is placed in front of a CRT or other back projection display or in front of a liquid crystal display (LCD), it interrupts ambient light rays and light rays which have reflected from the face of the CRT and blocks their exit from the front face of the filter such that they are not seen by the operator.

FIG. 1 illustrates the basic principle of the present invention. The anti-glare filter 10 is placed in front of the viewing screen of a CRT 12. The filter 10 is constructed of a sheet of material having a substantially planar first or back face 14 and a second or front face 16 having a plurality of V-shaped grooves. Each of the grooves is formed by two walls, a first sloping wall 18 and a second substantially horizontal wall 20. The sloping wall 18 is inclined at an angle of at least equal to our greater than the computed angle $\theta$ determined by equation (1). This inclination provides the anti-glare filter 10 with unique properties which are a result of the filter's geometry. The selection of the angle of inclination of the first wall 18 with respect to the first face 14 is an important feature of the present invention and discussed more fully hereinbelow.

The second wall 20 is shown in FIG. 1 as being substantially perpendicular to the first face 14, although it has been found that the second wall 20 may be inclined at an angle of as much as between plus or minus 10° with respect to a plane perpendicular to the first face 14.

In FIG. 1, the anti-glare filter 10 is constructed in accordance with one embodiment such that the first wall 18 is inclined at an angle of 37.2° (where I.R. equals 1.35) with respect to the first face 14. Light ray no. 1 is the most critical light ray which can enter the first wall 18. Light ray no. 1 is representative of ambient light coming from a beam of horizontal light, where most of the distracting light originates, from the nearest light source such as a window or lamp directly in front of the operator. Assuming the index of refraction of the material comprising the anti-glare filter 10 is 1.35, light ray no. 1 will, upon entering the second face 16, be refracted at an angle of 10.6°.

The light ray no. 1, upon striking the first face 14 at B, will partially pass through the first face 14 and is reflected off the screen 12 at D and returns along path 23 until ray 1 strikes the sloping wall 18 at point E. The light ray reflected at point B will strike the sloping wall 18 at point C. The angles at which the paths 24 and 25 of ray no. 1 strike point C and E on sloping wall 18 is 37.2° each. Any portion of ray no. 1 striking points C or E at an angle equal to or greater than 37.2° will be internally reflected as shown in FIG. 1.

It can be demonstrated that after ray no. 1 is internally reflected at points B, C or E, it repeatedly strikes the first face 14 and sloping wall 8 at angles greater than 37.2°. Therefore, there will never be a refracted ray no. 1 from these surfaces Ray no. 1 is thus said to be internally reflected such that no glare is caused by this light ray.

If the angle of inclination $\theta$ of the sloping wall 18 is less than the computed angle $\theta$ using Equation (1), light ray no. 1 will strike first face 14 at an angle less than angle $(\theta - b)$. Thereafter, reflected ray no. 1 will not strike the sloping wall 18 at an angle greater than or equal to the computed angle such that total internal reflection will not be achieved. Conversely, if the angle of inclination of the sloping wall 18 is greater than the computed angle $\theta$, ray no. 1 will be reflected off the first face 14 and strike the sloping wall 18 at an angle greater than the computed angle $\theta$ such that the reflected ray no. 1 will be totally internally reflected. Thus, it is necessary for proper operation of the present invention that the angle of inclination of the sloping wall 18 with respect to the first face 14 be at least the computed angle of inclination $\theta$ for the material of which the anti-glare filter 10 is constructed.

Listed below are the various materials which may be used to construct the anti-glare filter 10 of the present invention: Polymethylacrylate, polyethylacrylate, polytutylacrylate, polyethoxyethylacrylate, poly (2 methoxyethyl) acrylate, poly (2 bromo sec. butyl) acrylate, poly (2 bromo phenyl) acrylate, poly (2 chloromethyl) acrylate, polyacrylonitrile, polymethylmethacrylate, polyethylmethacrylate, poly butyl methacrylate, poly (t-butyl) methacrylate, polychclohexyl methacrylate, poly (2-hydroxyethyl) methacrylate, poly (2-phenoxyethyl) methacrylate, poly phenylmethacrylate, poly (o-chloro) styrene, poly (2.6 dichloro) styrene, poly (O-methoxy) styrene, polyacetal, poly (n-benzyl) methacrylamide, poly (N-butyl) methacrylamide, polyvinyl chloride, polyvinyl fluoride, polyvinylidene chloride, polyvinyl acetate, polyvinyl carbazole, polyvinyl isobutyl ether, polyvinyl alcohol, poly (n-vinyl) phthalimide, polyallyl phthalate, polyester-styrene, poly (o-tolyl) methacrylate, poly carbonates (bisphenol), poly (N-2, phenethy) methacrylamide, polystyrene, zinc crown glass, higher dispersion crown glass, light flint glass, heavy flint glass, and heaviest flint glass.

Another feature of the present invention is an anti-glare filter wherein the angle of inclination $\theta$ according to Equation (1) of the first sloping wall 18 is chosen to be above the critical angle with respect to the first face 14 such that ambient light entering the front face 16, passing through the first face 14, reflecting off the CRT 12, and passing back through the first face 14, is totally internally reflected.

FIG. 2 shows that the viewing area is dependent on the critical angle or the computed angle of inclination based on Equation (1). The filter 10, made of a material having an index of refraction of 1.35 has a critical angle of 47.8°. The upper limit of the viewing area is determined by the extension of the first sloping wall 18. The viewing area angle is therefore 90°−47.8° (critical angle)=42.2°. Substituting the computed angle of inclination according to Equation (1) of 37.2° for the critical angle of a material having an index of refraction of 1.35 increases the viewing area angle to 52.8° (90°−37.2°=52.8°), as illustrated in FIG. 2. Using the inclination angle $\theta$ based on Equation 1 of a filter material having an index of refraction of 1.4 or less, increases the viewing area angle 10.6°.

There are three ways to compensate for the light rays which escape from the anti-glare filter 10 through second wall 20. First, the second wall 20 may be covered with an opaque material which will absorb light. A second approach is to provide the second wall 20 with a roughened surface. A third approach is to provide a slight tint in the anti-glare filter 10 which will cut down on the light rays reflected back to the observer, as well as increasing the contrast of the intelligence displayed on the CRT.

Another factor which should be considered in designing an anti-glare filter is the fact that in the case of a CRT, where the face of the CRT is curved either spherically or cylindrically, the anti-glare filter should also be curved to be substantially parallel to the curvature of the CRT. That is, the anti-glare filter 10 should be curved or bent around its vertical and horizontal axes. Unless this is done, the rows or lines of the text appearing on the face of the CRT will appear to be arched.

A typical anti-glare filter 10 constructed according to the teachings of the present invention is, for example, constructed of a modified acrylic known in the trade as DR having a thickness of 40 mils and an index of refraction of 1.5. The filter is approximately 10 inches by 10 inches with 80 horizontal V-shaped grooves per inch. Each groove is comprised of a horizontal wall 20 extending approximately 7 ½ mils into the material and an inclined wall 18 having a slope of 30.91° with respect to the first face 14.

The anti-glare filter 10 disclosed herein is particularly advantageous when used in conjunction with a liquid crystal display (LCD). Because LCD's depend on reflected ambient light for visibility and the liquid crystal is enclosed between two layers of glass, the surfaces of which are notorious glare producers, the anti-glare filter 10 of the present invention is extremely well-suited for LCD's. If a filter, such as a circularly polarized medium, is placed in front of an LCD to cut out surface glare, it also cuts out much of the ambient light on which the LCD depends for visibility and the display becomes unreadable. However, some filtering is needed since in many situations there is so much ambient light coming from so many different directions that the display is all but useless. The anti-glare filter 10 of the present invention does not depend on tint or polarization and therefore allows all the ambient light to enter. At the same time, however, the anti-glare filter 10 does not completely cancel all specular glare from the glass surfaces. Also, since most LCD's are flat, there is no curvature complication to contend with as in the case of CRT's. Therefore, it is very advantageous to use the present invention in conjunction with LCD's.

It will be understood that the embodiment described herein is merely exemplary and that a person of ordinary skill in the art may make many variations and modifications without departing from the spirit and scope of the invention. All such modifications and variations are intended to be included within the scope of the invention as defined in the appended claims.

What is claimed is:

1. A filter for reducing the glare of a viewing screen caused by ambient light and increasing the vertical viewing area, comprising a substantially transparent sheet of material having first and second faces, said first face being substantially planar and said second face having a plurality of V-shaped grooves, each groove being formed by a sloping wall and a substantially horizontal wall, said sloping wall being inclined at an angle with respect to said first face at least equal to or greater than the computed angle $\theta$ determined by the equation:

$$\sin(\text{angle } \theta) = \text{I.R.} \times \sin(2 \text{ angle } \theta - \text{C.A.}),$$

Where:
I.R. = the Index of Refraction of the filter material, and

C.A. = the Critical Angle of the filter material.

2. The filter of claim 1 wherein the viewing screen includes a transmission screen.

3. The filter of claim 2 wherein said first and second faces are curved to follow the contours of said transmission screen.

4. The filter of claim 1 wherein said first and second faces are curved about a vertical axis.

5. The filter of claim 1 wherein said substantially horizontal wall of said second face is coated with an opaque material.

6. The filter of claim 1 wherein said substantially horizontal wall of said second face has a roughened surface.

7. The filter of claim 1 wherein said substantially horizontal wall of said second face is inclined at an angle of between plus 10° and minus 10° with respect to a line perpendicular to said first face.

8. The filter of claim 1 wherein said sheet of material is tinted.

9. The filter of claim 1 wherein the viewing screen includes a liquid crystal display.

10. The filter of claim 9 wherein a portion of said horizontal wall of said second face is covered with an opaque material.

11. The filter of claim 10 wherein said portion of said horizontal wall of said second face covered with said opaque material includes that portion of said horizontal wall furthest from said first face.

12. The filter of claim 1 wherein said material has an Index of Refraction of 1.35.

13. The filter of claim 1 wherein said angle $\theta$ is 37.2°.

14. The filter of claim 1 wherein critical angle is determined by the equation:

$$\sin(\text{critical angle}) = 1/\text{I.R.}$$

15. A method for reducing the glare of a viewing screen caused by ambient light, and increasing the vertical viewing area, comprising the steps of providing a filter comprised of a substantially transparent sheet of material having first and second faces, said first face being substantially planar and said second face having a plurality of V-shaped grooves, each groove being formed by two walls, one of said walls being inclined at an angle with respect to said first face of at least equal to or greater than the computed angle $\theta$ determined by the equation:

$$\sin(\text{angle } \theta) = \text{I.R.} \times \sin(2 \text{ angle } \theta - \text{C.A.}),$$

Where:
I.R. = the Index of Refraction of the filter material, and

C.A. = the Critical Angle of the filter material.

* * * * *

UNITED STATES PATENT AND TRADEMARK OFFICE
CERTIFICATE OF CORRECTION

PATENT NO. : 4,995,701

DATED : February 26, 1991

INVENTOR(S) : Brown

It is certified that error appears in the above-identified patent and that said Letters Patent is hereby corrected as shown below:

Column 5, line 50, "8" should read --18--.
Column 5, line 52, after "surfaces", insert --.--.

Signed and Sealed this

Twenty-fifth Day of August, 1992

Attest:

DOUGLAS B. COMER

Attesting Officer      Acting Commissioner of Patents and Trademarks